United States Patent
Leibowitz et al.

(10) Patent No.: US 11,181,941 B2
(45) Date of Patent: Nov. 23, 2021

(54) USING A STUTTERED CLOCK SIGNAL TO REDUCE SELF-INDUCED VOLTAGE NOISE

(71) Applicant: Rambus Inc., Sunnyvale, CA (US)

(72) Inventors: Brian S. Leibowitz, San Francisco, CA (US); Jared L. Zerbe, Woodside, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 16/546,687

(22) Filed: Aug. 21, 2019

(65) Prior Publication Data
US 2020/0042034 A1    Feb. 6, 2020

Related U.S. Application Data

(63) Continuation of application No. 13/883,265, filed as application No. PCT/US2011/058525 on Oct. 31, 2011, now Pat. No. 10,401,900.

(60) Provisional application No. 61/411,874, filed on Nov. 9, 2010.

(51) Int. Cl.
*G06F 1/12* (2006.01)
*G06F 1/08* (2006.01)
*G06F 1/3237* (2019.01)

(52) U.S. Cl.
CPC .............. *G06F 1/12* (2013.01); *G06F 1/08* (2013.01); *G06F 1/3237* (2013.01); *Y02D 10/00* (2018.01); *Y02D 30/50* (2020.08)

(58) Field of Classification Search
CPC combination set(s) only.
See application file for complete search history.

(56) References Cited

U.S. PATENT DOCUMENTS

| | | | |
|---|---|---|---|
| 4,093,960 A | * | 6/1978 | Estes ............... H04N 17/045 348/182 |
| 4,349,832 A | | 9/1982 | Gallo |
| 4,414,676 A | | 11/1983 | Kraul et al. |
| 4,751,653 A | | 6/1988 | Junk et al. |

(Continued)

FOREIGN PATENT DOCUMENTS

| | | |
|---|---|---|
| EP | 1075107 | 2/2001 |
| WO | WO-2009-055103 A2 | 4/2009 |

(Continued)

OTHER PUBLICATIONS

International Search Report and Written Opinion dated May 29, 2012 for International Application No. PCT/US2011/058525. 11 pages.

*Primary Examiner* — Regis J Betsch
*Assistant Examiner* — Kaleria Knox
(74) *Attorney, Agent, or Firm* — Lance Kreisman; Peninsula Patent Group

(57) ABSTRACT

The disclosed embodiments relate to a technique that uses a modified timing signal to reduce self-induced voltage noise in a synchronous system. During a transient period associated with a deterministic event in the synchronous system, the technique uses a modified timing signal generated based on a normal timing signal as a timing signal for the synchronous system. Outside of the transient period, the technique uses the normal timing as the timing signal for the synchronous system. In some embodiments, the modified timing signal is generated by skipping a pattern of clock transitions in the normal timing signal.

20 Claims, 16 Drawing Sheets

(56) References Cited

U.S. PATENT DOCUMENTS

| | | | |
|---|---|---|---|
| 4,970,442 A * | 11/1990 | Harada | H04N 3/22 315/367 |
| 5,247,164 A * | 9/1993 | Takahashi | G06K 7/0008 235/380 |
| 5,537,581 A * | 7/1996 | Conary | G06F 1/08 713/501 |
| 5,774,701 A * | 6/1998 | Matsui | G06F 1/08 713/501 |
| 5,959,982 A * | 9/1999 | Federkins | H04J 3/0685 370/336 |
| 6,320,275 B1 * | 11/2001 | Okamoto | B60L 3/04 307/10.1 |
| 7,447,929 B2 | 11/2008 | McCall et al. | |
| 8,793,525 B2 | 7/2014 | Zerbe et al. | |
| 2002/0094786 A1* | 7/2002 | Berliner | H04B 1/7156 455/67.16 |
| 2002/0196869 A1 | 12/2002 | Friedman | |
| 2006/0239391 A1 | 10/2006 | Flanagan | |
| 2007/0011521 A1* | 1/2007 | Dubey | G11C 29/022 714/724 |
| 2008/0056423 A1* | 3/2008 | Jeon | H04L 7/10 375/359 |
| 2008/0245878 A1* | 10/2008 | Shiota | G06K 19/07732 235/492 |
| 2009/0141646 A1 | 6/2009 | Legg | |
| 2009/0161428 A1 | 6/2009 | Unger | |
| 2009/0296531 A1 | 12/2009 | Haartsen et al. | |
| 2010/0241918 A1* | 9/2010 | Nedovic | H03L 7/087 714/746 |
| 2011/0043220 A1 | 2/2011 | Leibowitz et al. | |
| 2011/0239031 A1 | 9/2011 | Ware et al. | |
| 2011/0249718 A1* | 10/2011 | Zerbe | H03L 7/07 375/226 |
| 2011/0257706 A1* | 10/2011 | Karr | A61N 1/37276 607/60 |

FOREIGN PATENT DOCUMENTS

| | | |
|---|---|---|
| WO | WO-2009-137522 A2 | 11/2009 |
| WO | WO-2010-080173 A1 | 7/2010 |

* cited by examiner

USING A STUTTERED CLOCK SIGNAL TO REDUCE SELF-INDUCED VOLTAGE NOISE

CROSS REFERENCE TO RELATED APPLICATIONS

This application is a Continuation application of U.S. application Ser. No. 13/883,265, filed May 2, 2013, titled "USING A STUTTERED CLOCK SIGNAL TO REDUCE SELF-INDUCED VOLTAGE NOISE", which is a national stage application of international application number PCT/US2011/058525, filed Oct. 31, 2011, which claims the benefit of U.S. Provisional Application No. 61/411,874, filed Nov. 9, 2010, all of which are incorporated by reference herein in their entireties.

BACKGROUND

Technical Field

The disclosed embodiments generally relate to techniques for reducing noise in synchronous systems. More specifically, the disclosed embodiments relate to a technique for using a stuttered clock signal to reduce transient noise in a synchronous system.

Background

Extending battery life is a primary consideration in portable computing devices, such as laptop computers and smartphones. To conserve power, portable computing devices often halt clock signals to specific circuits that become idle during system operation. This clock-stopping technique is effective at reducing power consumption because the Complementary Metal Oxide Semiconductor (CMOS) circuitry within a portable computing device consumes substantially more power while the circuits are switching, and substantially less power while the circuits are idle.

Unfortunately, stopping and starting clock signals in computer systems can adversely affect system performance. For example, a given integrated circuit (IC) within a computer system typically has a power delivery network (PDN), which comprises both on-chip and off-chip components. When a clock signal to the IC (or a clock signal inside the IC) is stopped to save power and is then restarted, the IC immediately starts demanding power from the PDN. Because the PDN has a complex impedance, this sudden increase in demand for power causes a transient voltage response in the PDN. As a result, the voltage supplied to circuits with the IC typically starts to droop and then starts ringing. This fluctuating voltage can cause clock signals and transceivers in the IC to have different delays, which can cause timing margins to decrease and can cause data errors.

These problems with voltage fluctuations can be avoided by simply waiting until the voltage fluctuations diminish which, for example, may involve waiting for tens of nanoseconds. However, in computer systems where clock signals are stopped and started frequently, waiting for these voltage fluctuations to diminish whenever a clock signal is restarted can adversely affect computer system performance.

Hence, what is needed is a method and an apparatus that supports stopping and starting clock signals within a computer system without the above-described voltage fluctuation problems.

DETAILED DESCRIPTION

The disclosed embodiments generally relate to techniques for using a modified timing signal to reduce self-induced voltage noise in a synchronous system. More specifically, during a transient period associated with a deterministic event in the synchronous system (such as a clock-starting event), the technique uses a modified timing signal generated based on a normal timing signal as a timing signal for the synchronous system. Outside of the transient period, the technique uses the normal timing signal instead of the modified timing signal as the timing signal for the synchronous system. In some embodiments, the modified timing signal is generated by skipping a pattern of clock transitions in the normal timing signal. This skipping of clock transitions is referred to as "clock stuttering." Measurements which are described in more detail below indicate that this technique can significantly reduce the magnitude and duration of voltage ringing during a transient period associated with a clock-starting event.

Figure 1A:
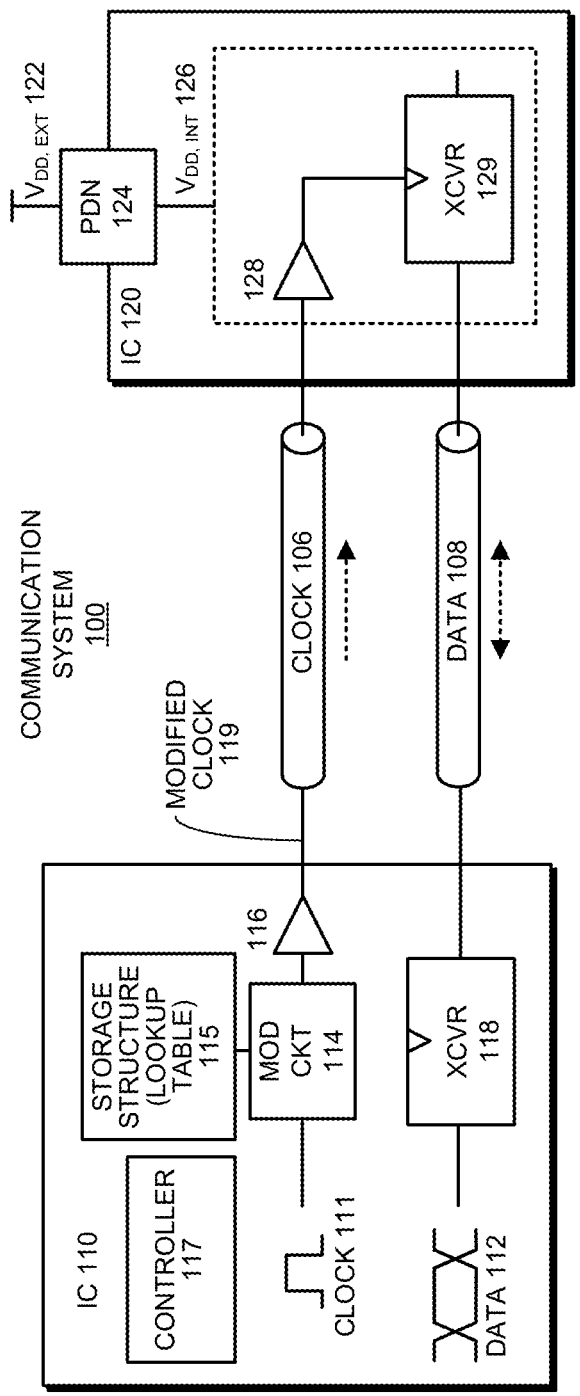
FIG. 1A illustrates a communication system in accordance with the disclosed embodiments.

The above-described technique can be used in a number of different contexts. For example, FIG. 1A illustrates how the technique can be used in a communication system 100 in accordance with the disclosed embodiments. In communication system 100, a clock signal 111 and one or more data signals 112 are communicated from a first integrated circuit (IC) 110 to a second IC 120. Note that although FIG. 1A illustrates a bidirectional system, in general the above-described technique can be applied to many other types of unidirectional or bidirectional systems.

During normal system operation in the case of data communication from IC 110 to IC 120, data signal 112 is communicated first through a transceiver (XCVR) 118 within IC 110 and then through a bidirectional data channel 108 to a corresponding XCVR 129 in IC 120. At the same time, an associated clock signal 111 within IC 110 first passes through a modification circuit 114 and then through a buffer 116 which drives a modified clock signal 119 onto a clock channel 106. The modified clock signal 119 from clock channel 106 is received at a buffer 128 in IC 120 and then feeds into XCVR 129, wherein the modified clock signal 119 is used to receive the data signal 112.

Modification circuit 114 can modify clock signal 111 by skipping clock transitions in clock signal 111 to produce a modified clock signal during a transient period associated with a deterministic event, such as a clock-starting event. (This clock transition skipping process is described in more detail below.) Moreover, some embodiments store modification parameters which define how the clock signal 111 is modified in a storage structure 115, which for example can be implemented as a lookup table. Note that the process of modifying clock signal 111 is coordinated by circuitry within controller 117 in IC 110.

Note also that the circuitry within IC 120 receives power through a power distribution network (PDN) 124, which comprises both on-chip and off-chip components. PDN 124 receives an external voltage $V_{DD,EXT}$ 122 and supplies an internal voltage $V_{DD,INT}$ 126 to circuits within IC 120. As mentioned above, PDN 124 has a complex impedance which includes resistive, capacitive and inductive components, which can potentially cause ringing problems when power demand changes abruptly.

Figure 1B:
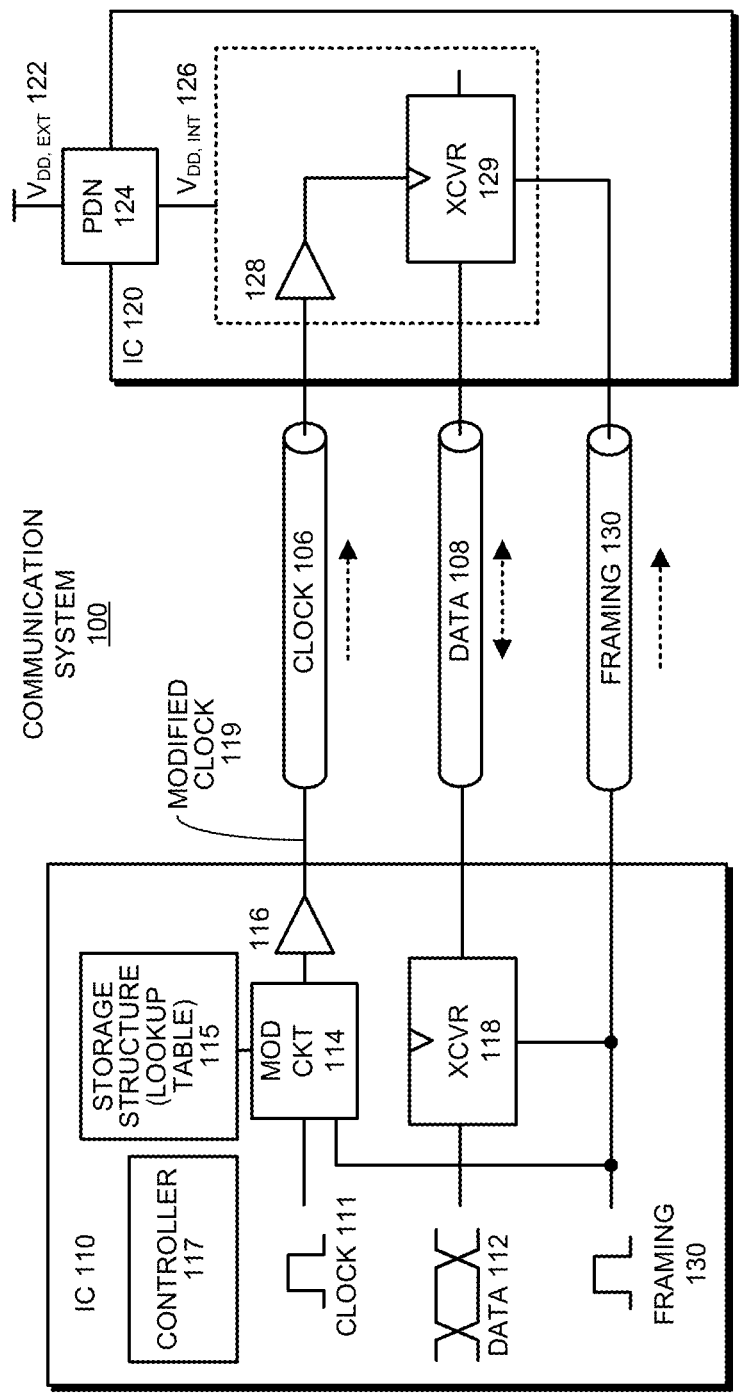
FIG. 1B illustrates an alternative implementation of a communication system in accordance with the disclosed embodiments.

FIG. 1B illustrates an alternative implementation of a communication system in accordance with the disclosed embodiments. This system is the same as the system illustrated in FIG. 1A except that the system also includes a framing signal 130, which for example can be a word latch clock signal that operates at 1/16 of the system's data rate and marks the start of a new data word. This framing signal 130 feeds into modification circuit 114 and XCVR 118 on IC 110, and also into XCVR 129 on IC 120. Framing signal 130 can be used by the system to bring XCVR 118 and XCVR 129 back into synchronization in situations where the clock stuttering (or some other event) causes XCVR 118 and XCVR 129 to become unsynchronized.

CPU Chip

Figure 2:
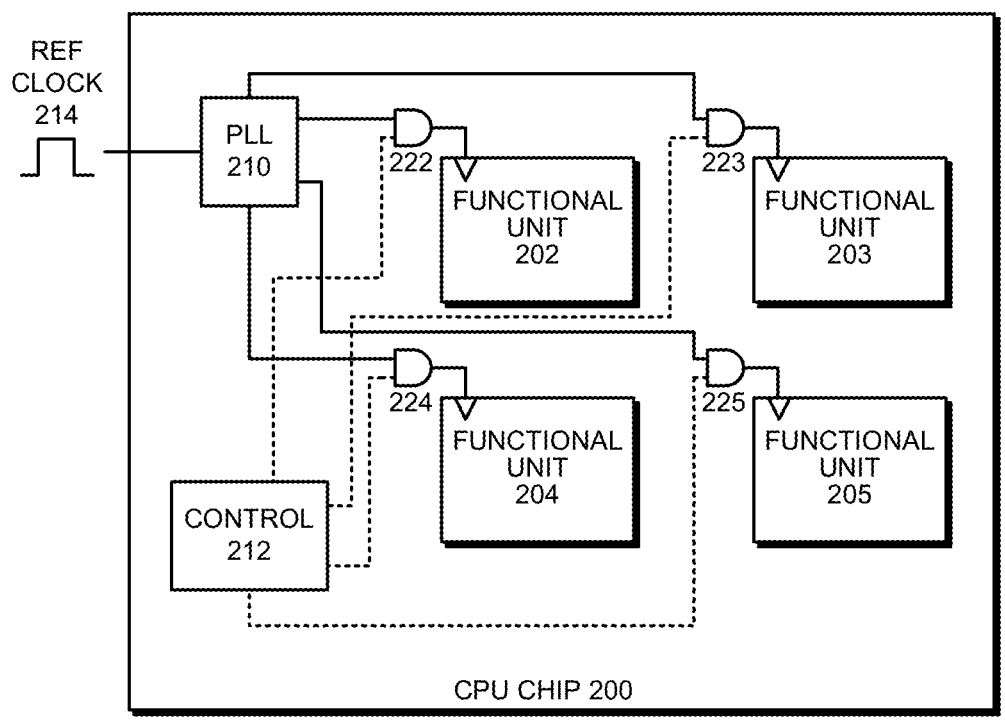
FIG. 2 illustrates a central-processing unit (CPU) chip in accordance with the disclosed embodiments.

In another example, the technique can be used in a central-processing unit (CPU) chip 200 with multiple functional units as is illustrated in FIG. 2. More specifically, CPU chip 200 includes a number of functional units 202-205. These functional units 202-205 can include separate processor cores or possibly other blocks of circuitry, such as arithmetic logic units (ALUs) or cache memories. CPU chip 200 also includes a phase-locked loop (PLL) 210 which provides a normal timing signal for circuitry within processor chip 200. Note that PLL 210 is tied to an external reference clock signal 214, which is received from an off-chip clock source.

Outputs from PLL 210 feed through a clock distribution network and then through gated clock buffers 222-225 (which are illustrated as AND gates) before feeding into respective functional units 202-205. In this way, the clock signal for each functional unit 202-205 can be stopped separately. Note that the clock signals are selectively enabled by a control logic block 212, which generates control signals that feed into the AND gates 222-225 for each of the respective functional units 202-205. (These control signals are illustrated by the dashed lines which appear in FIG. 2.)

Note that each clock-starting and clock-stopping event can lead to ringing in the voltage supply for the associated functional unit. Hence, the clock-modification techniques described in this specification can be applied to the clock signals for each of the functional units 202-205.

Moreover, although the specific example illustrated in FIG. 2 is a CPU chip, the same general technique can be applied to any synchronous system wherein a clock signal to a portion of the synchronous system (or the entire synchronous system) can be selectively enabled. Hence, the described technique is not meant to be limited to the examples illustrated in FIGS. 1 and 2.

Also note that the clock stuttering can be performed by a circuit that does not directly perform the communication operations or the processing operations, such as a control circuit located on a different integrated circuit chip. For example, the clock stuttering can be performed by a clock-control circuit for a module which includes multiple memory devices.

Clock Stuttering

Figure 3:
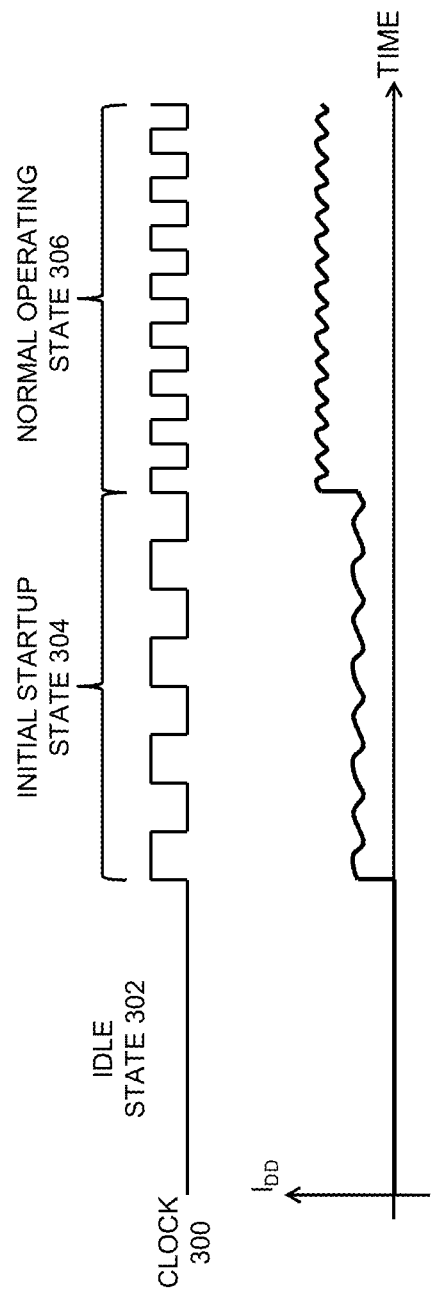
FIG. 3 presents a graph illustrating current usage at two different clock speeds in accordance with the disclosed embodiments.

FIG. 3 presents a graph illustrating one example of how clock stuttering can be used in accordance with the disclosed embodiments. The top portion of the graph in FIG. 3 illustrates a clock signal 300, which for example can be a modified clock signal that is forwarded along with a data signal, for example in a communication system 100 as is illustrated in FIG. 1A. It can also be a gated clock signal which feeds into a functional unit as is illustrated in FIG. 2. The bottom portion of the graph illustrates the current $I_{DD}$ through the circuit, wherein the circuit is clocked using clock signal 300. Note that current $I_{DD}$ is an indicator of the power consumption for the circuit, wherein the power consumption can be computed as $I_{DD} \times V_{DD}$, wherein $V_{DD}$ is the voltage for the circuit.

As is illustrated in the top portion of FIG. 3, clock signal 300 starts in an idle state 302, and then transitions into an initial startup state 304, wherein the clock signal is switching at half speed. Next, after the initial startup state 304, clock signal 300 transitions to a normal operating state 306, wherein clock signal 300 operates at full.

The corresponding current consumption, which is illustrated in the bottom portion of FIG. 3, roughly tracks the clock speed. Note that during the idle state 302 there is some amount of static leakage current, but the switching current is effectively zero. Hence, $I_{DD}$ starts off at a low level during the idle state 302. (Note that $I_{DD}$ appears to be zero in FIG. 3, but actually includes a small static leakage current.) Next, during the initial startup state 304, the clock signal is at half speed, so the switching current (and power consumption) is similarly at about at one half of its normal level. Finally, during the normal operating state 306, the current (and power consumption) is at a normal operating level. Note that, by increasing the power consumption in two discrete steps instead of one large step, the voltage ringing can be significantly reduced as is described in more detail below. In FIG. 3 the current $I_{DD}$ is shown to be approximately constant within the initial startup state and the normal operating state, with some periodic variations related to the clock period. These variations represent the fact that the individual clock edges induce current pulses that contribute to $I_{DD}$. This figure is indicative of a case where the duration of each pulse is comparable to or longer than the clock period itself, so that the current pulses blend together. In other cases where the current pulses are relatively short, the net $I_{DD}$ current waveform may appear more like a pulse train. The clock stuttering techniques described can apply in either case.

Figure 4:
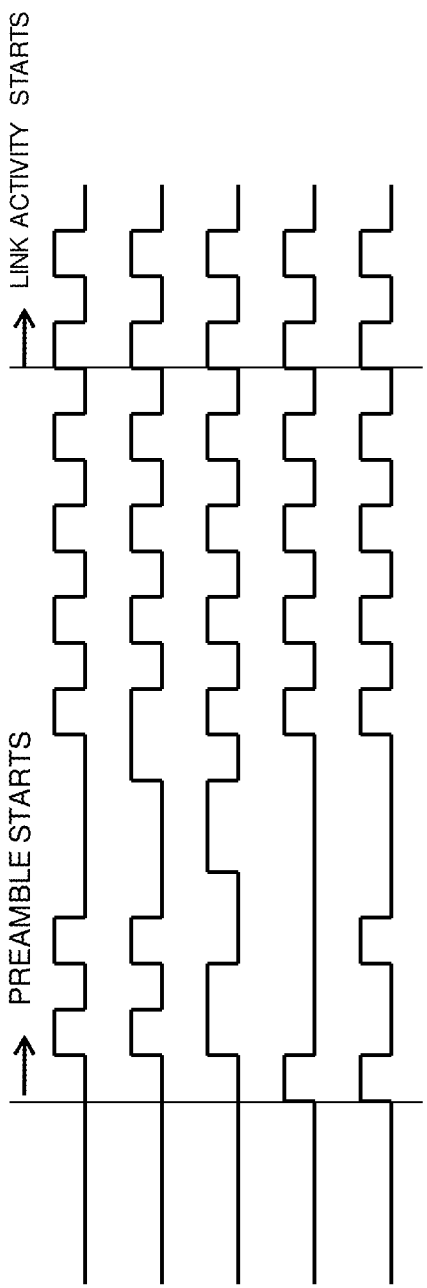
FIG. 4 illustrates different clock-stuttering preamble patterns in accordance with the disclosed embodiments.

FIG. 4 illustrates a number of different clock-stuttering preamble patterns in accordance with the disclosed embodiments. In each of these preamble patterns, a number of clock edges in the normal clock signal are skipped near the start of the preamble. On the other hand, near the end of the preamble, fewer clock edges are skipped and the preamble eventually reverts to the normal clock signal. These preamble patterns are more general than the pattern shown for clock 300 in FIG. 3 during initial startup state 304 in that they are not restricted to merely being half-speed clocks, but can have arbitrary patterns of skipped clock edges. Note that the optimal preamble pattern depends on the impedance of the specific power distribution network (PDN) for the circuits that are being clocked.

An advantage of using clock stuttering to produce the modified clock signal is that clock stuttering is simple to implement; a very simple circuit can be used to skip clock edges. However, the use of a stuttered clock limits the types of startup waveforms that can be used. More generally, the modified clock signal can include any type of waveform that reduces voltage ringing for the circuit. For example, instead of skipping clock edges, the timing of the clock edges can be shifted by sub-wavelength increments. In addition, a higher clock frequency, which can be generated by multiplying the normal clock signal, can be used in part of the modified clock signal.

Voltage Noise

Figure 5A:
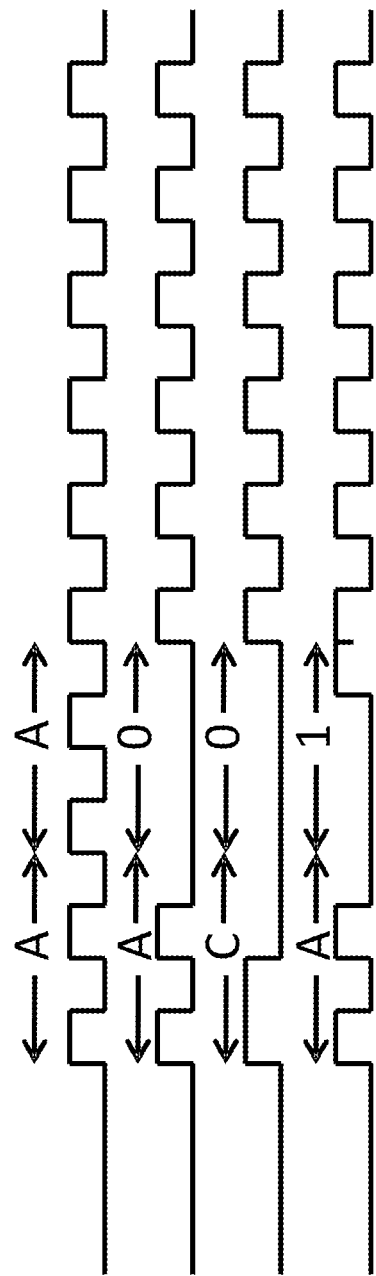
FIG. 5A illustrates different preambles in accordance with the disclosed embodiments.

Each preamble affects the voltage noise in a different way. For example, FIG. 5A illustrates a number of different preambles, and FIGS. 5B-5E illustrate voltage noise associated with the preambles in accordance with the disclosed embodiments. Referring to FIG. 5A, in these preambles, the pattern of clock edges is represented by two consecutive hexadecimal digits, where each digit represents a four-bit binary pattern that describes a portion of the clock waveform. For example, the hexadecimal digits AA=10101010 represent a preamble segment with an alternating pattern of clock edges wherein no clock edges are skipped. In contrast, the hexadecimal digits 00=00000000 represent a segment of an idle clock signal with no clock edges. Finally, the hexadecimal digits CC=11001100 represent a preamble that skips every other clock edge so the preamble has effectively half the clock speed of the normal clock signal.

Figure 5B:
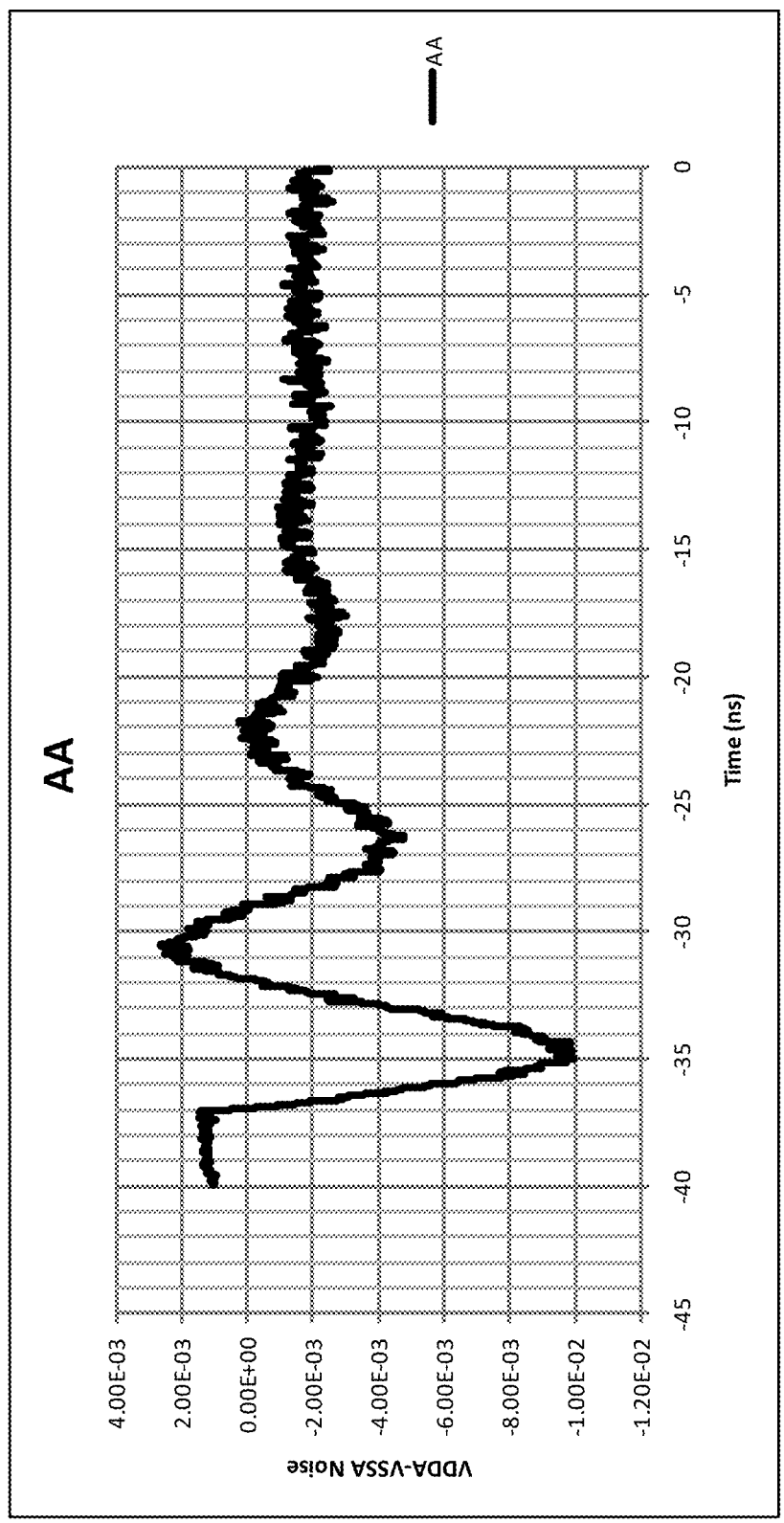
FIGS. 5B-5E illustrate voltage noise associated with the different preambles in accordance with the disclosed embodiments.
Figure 5C:
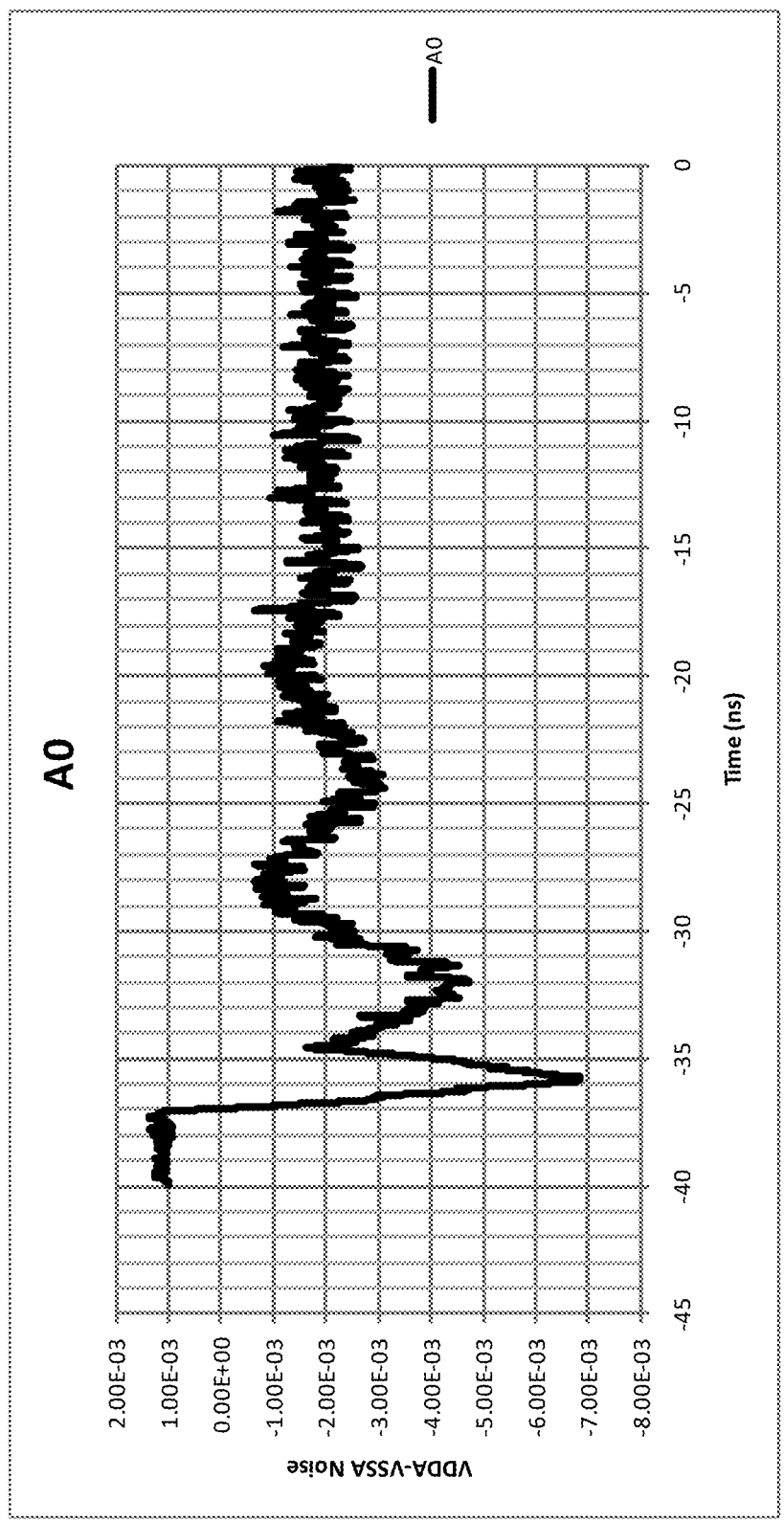
Figure 5D:
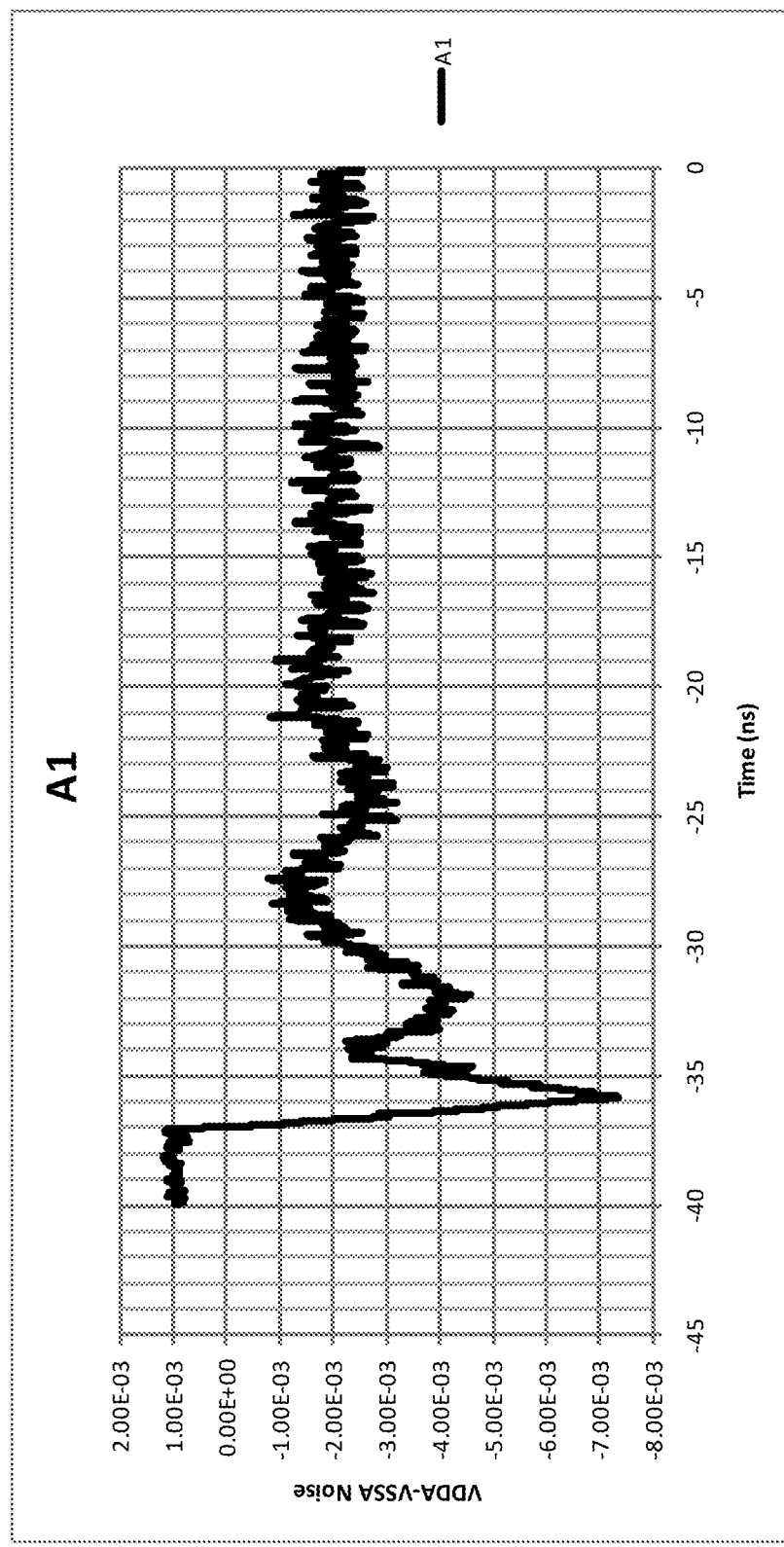
Figure 5E:
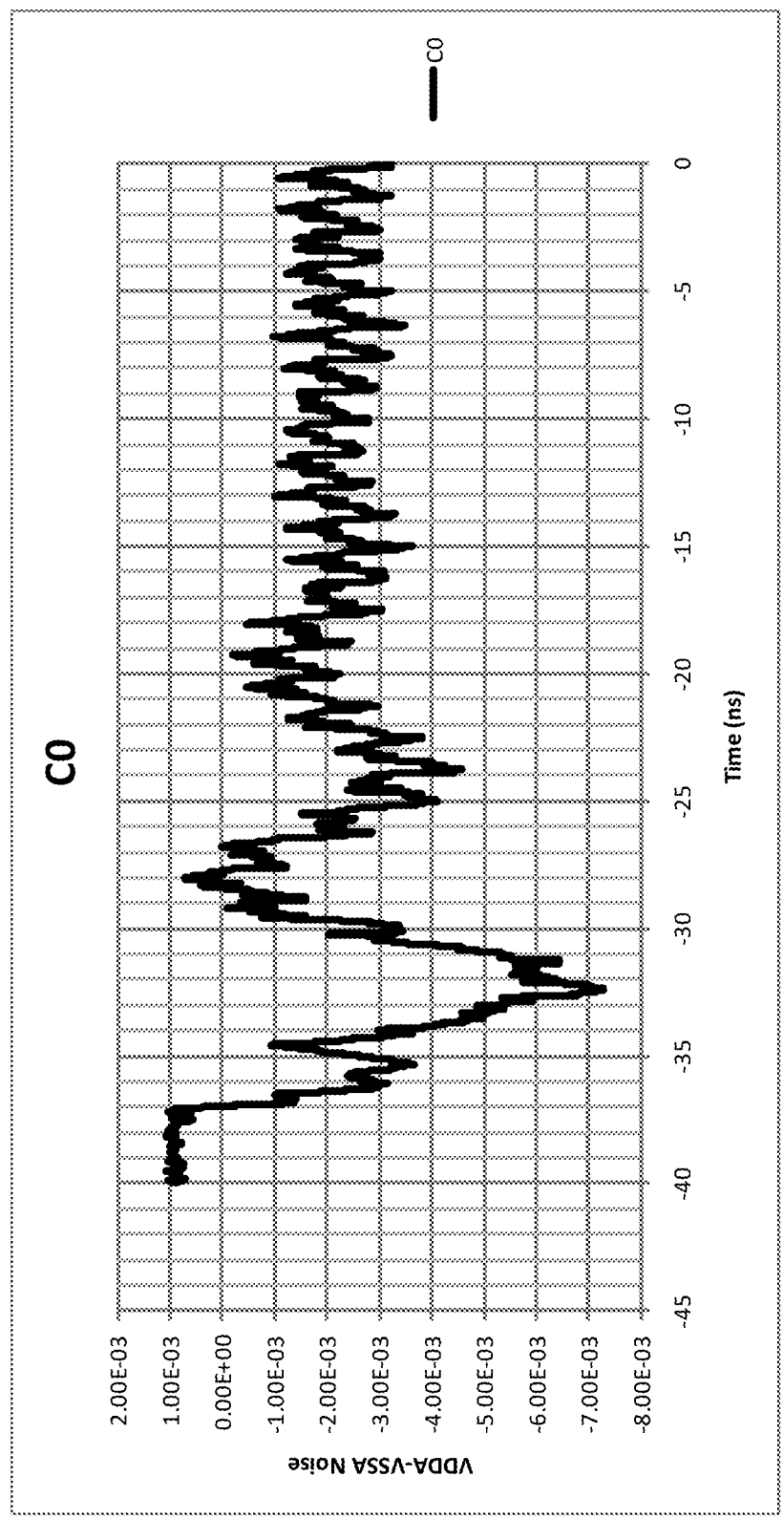

Note that the preamble clock waveforms in FIG. 5A and the associated voltage noise transients in FIGS. 5B-5E are shown with different time scales. Also, note that the voltage response for the preamble AA (in which case there is no stuttering—the clock transitions directly from idle to full speed operation), which is represented in FIG. 5B, droops the farthest and then rings for the longest period of time. In contrast, the voltage response for the preamble A0, which is represented in FIG. 5C, droops considerably less and the ringing dies out faster. Note that the voltage response for the preamble A1, which is represented in FIG. 5D, is very similar to the voltage response for the preamble A0. Finally, the voltage response for the preamble C0, which is represented in FIG. 5D, starts drooping later than the other preambles, and then rings for almost as long as the preamble AA. In these examples, the ringing for the preambles A0 or A1 dies out faster than the ringing for the preambles AA and C0. While FIGS. 5A-5E illustrate different preambles, clock waveforms, and associated supply noise transients for a clock start operation, similar results hold for a clock stop operation. In that case, a stuttered clock preamble may be inserted before the clock returns to the idle state from the normal state. For consistency we call this modified clock period a "preamble" to indicate that it occurs before the clock enters the idle state, even though it comes after normal operation of the clock. Even though the system does not operate in the clock stop state, supply noise can still be a concern because the clock may be restarted again before the supply ringing has settled, or because the same supply voltage is shared by other components which may still be operating (such as in CPU chip 200 in FIG. 2).

Figure 6A:
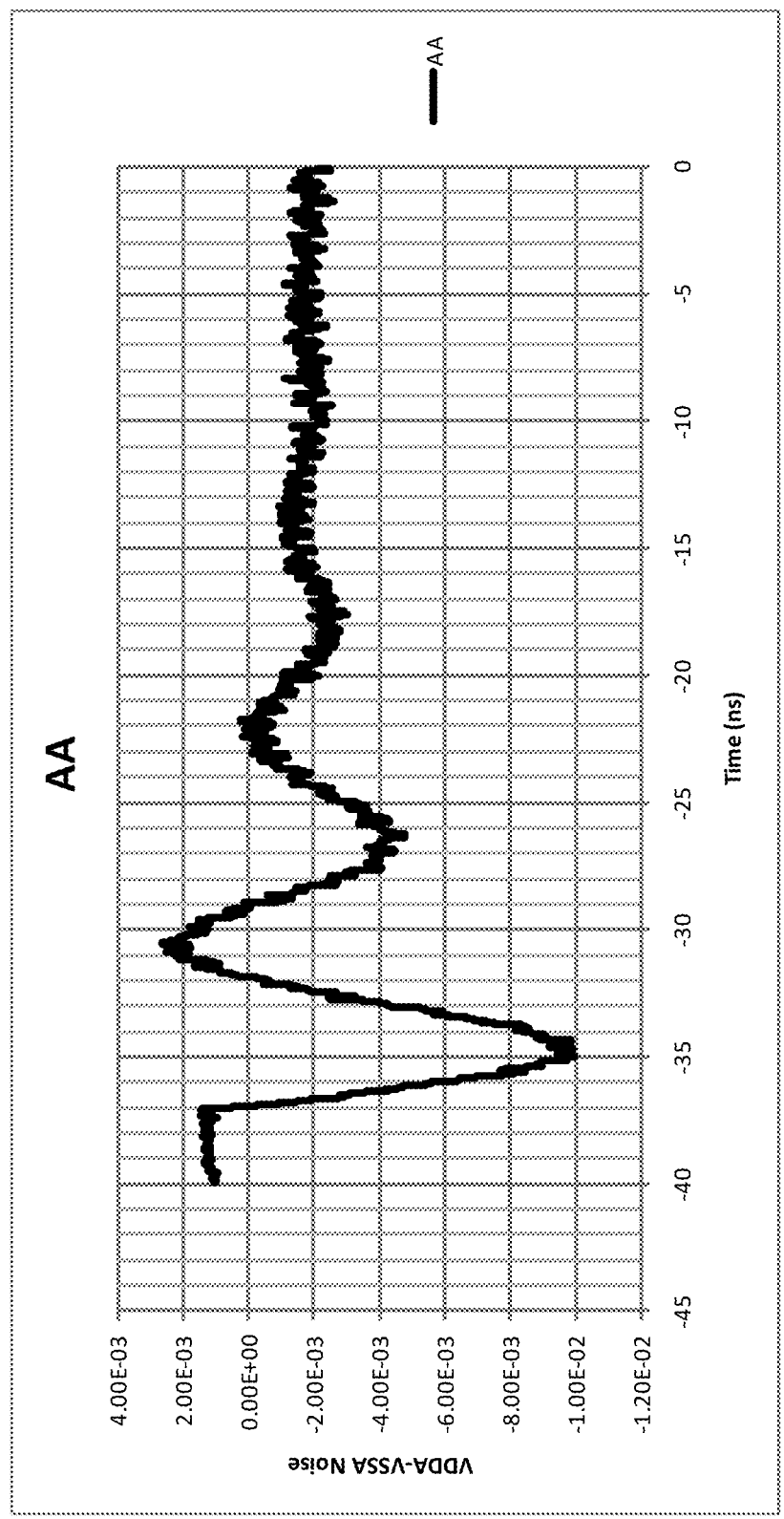
FIGS. 6A-6E illustrate voltage noise associated with different length half-speed preambles in accordance with the disclosed embodiments.
Figure 6B:
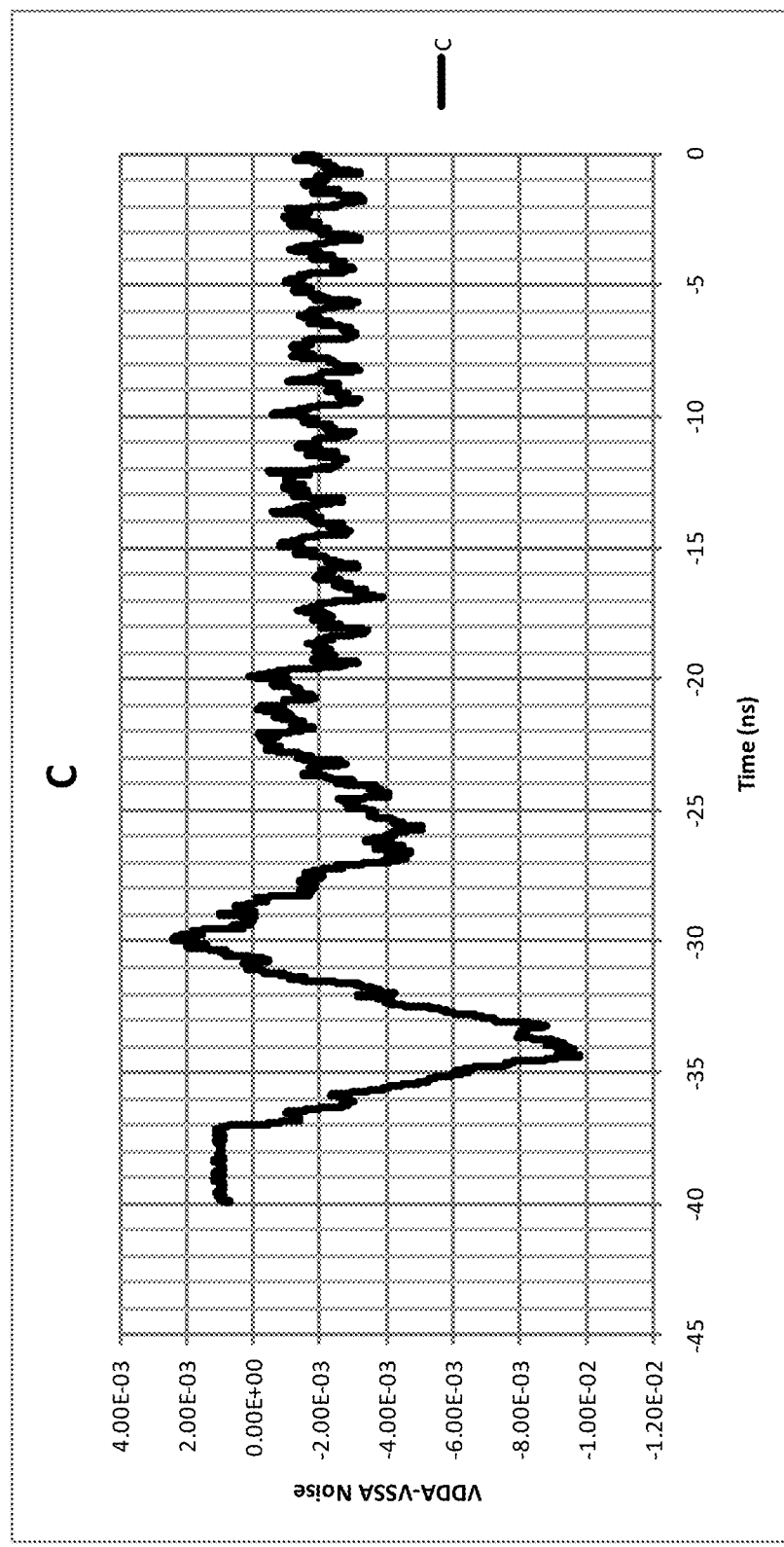
Figure 6C:
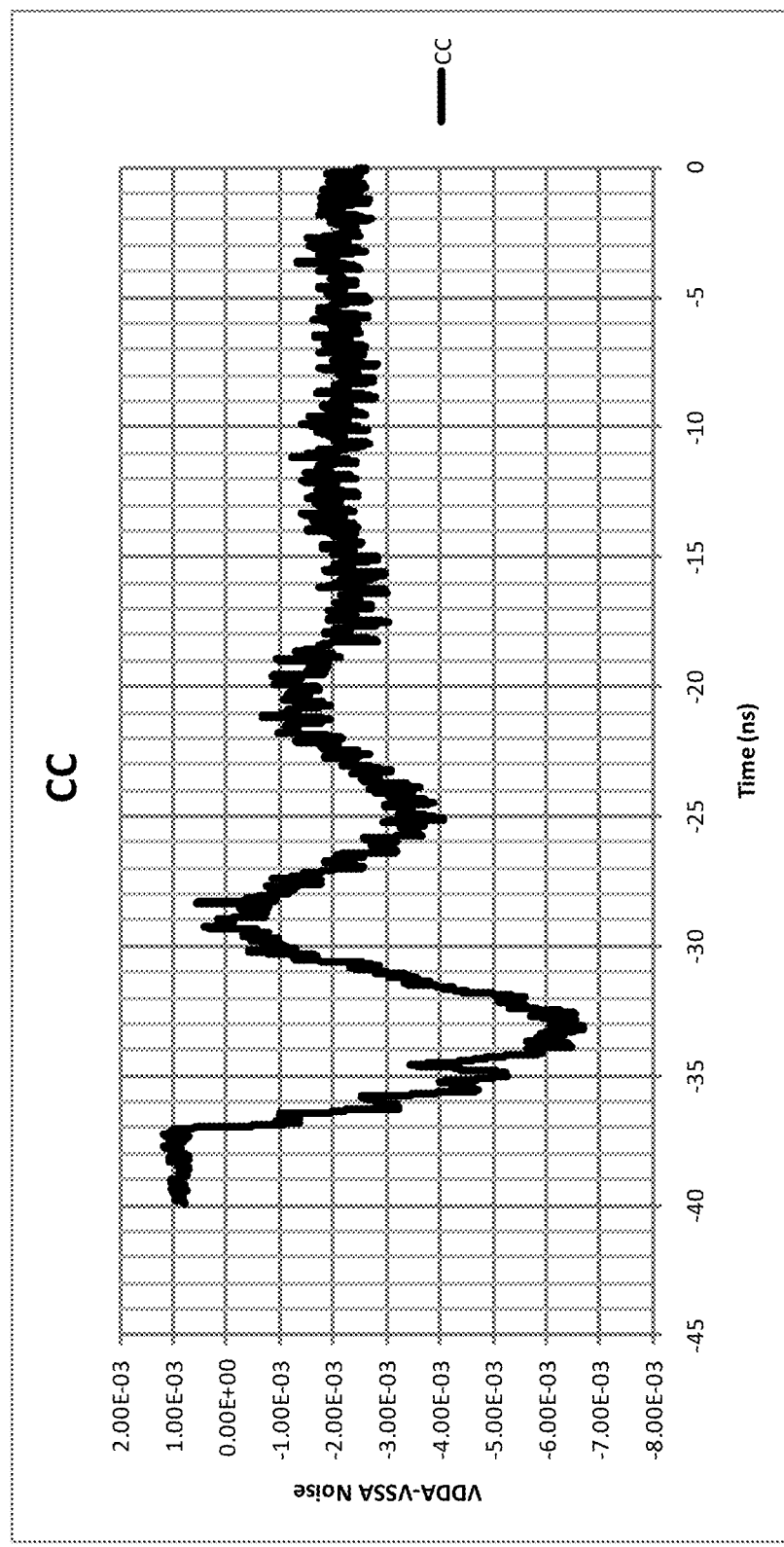
Figure 6D:
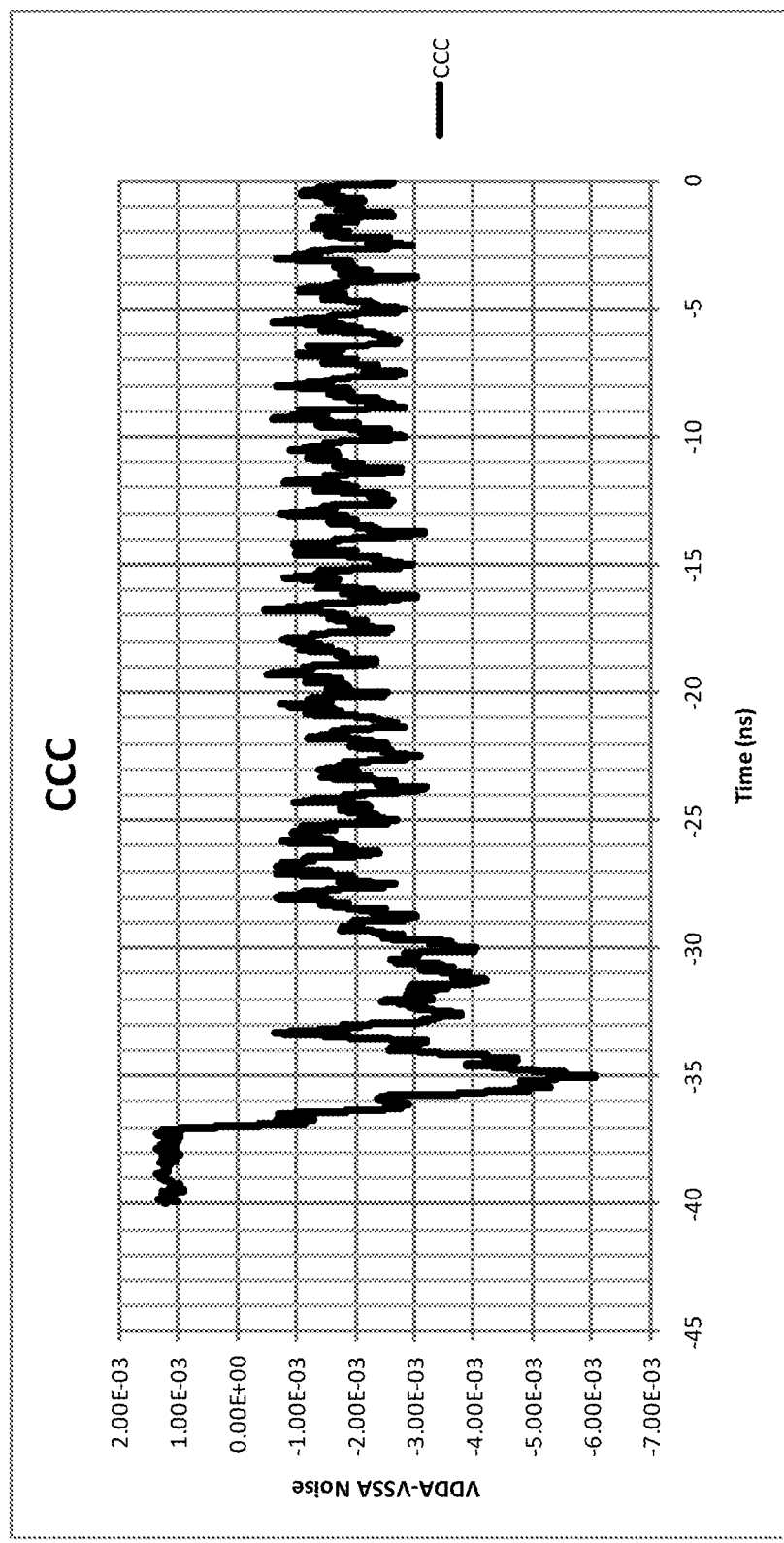
Figure 6E:
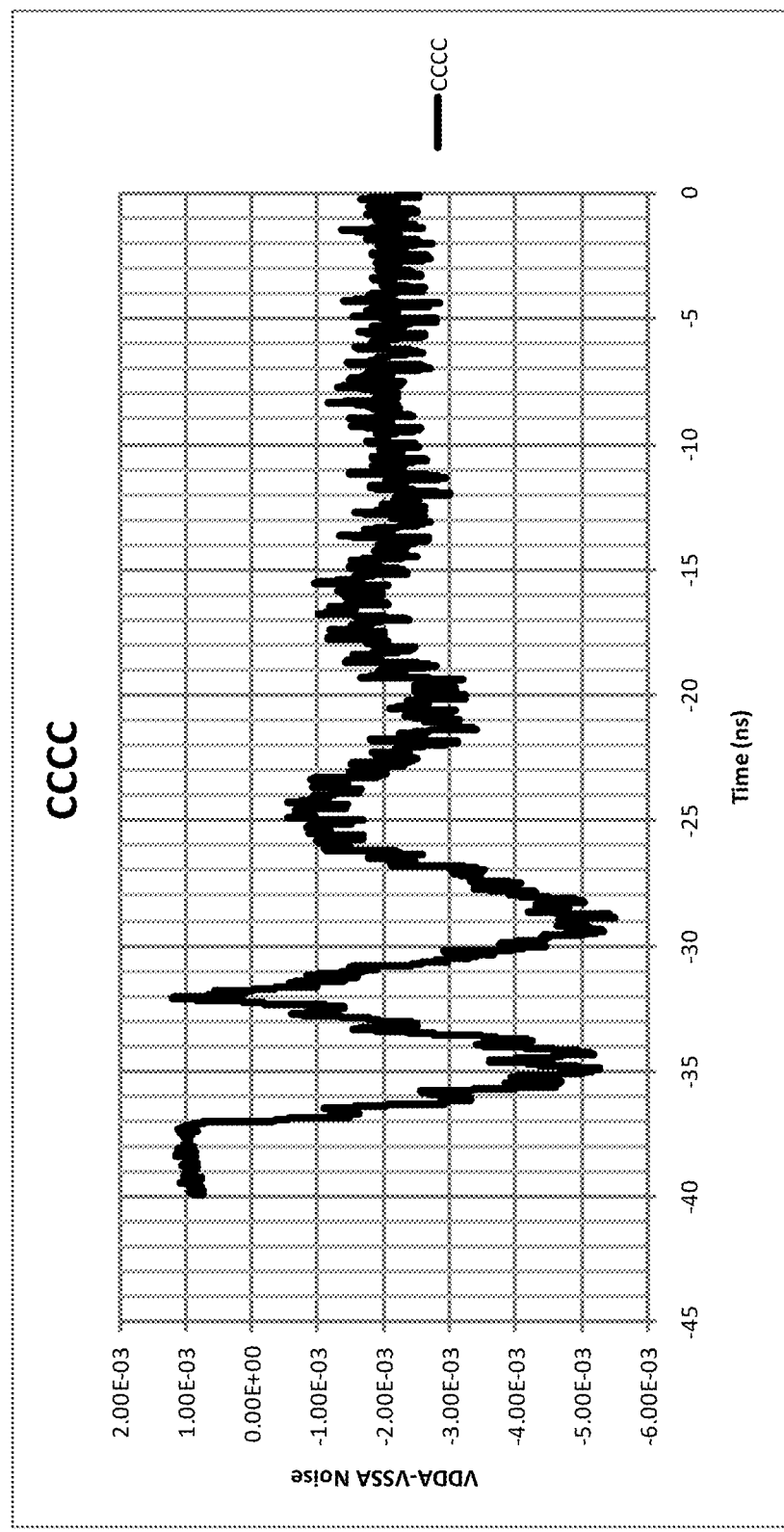

The graphs in FIGS. 6A-6E illustrate another example of voltage noise associated with different length half-speed preambles in accordance with the disclosed embodiments. More specifically, the graphs in FIGS. 6A-6E illustrate voltage responses for a baseline full-speed preamble AA, and also for different length half-speed preambles C, CC, CCC and CCCC. In this example, the baseline voltage response for the preamble AA, which is represented in FIG. 6A, droops the farthest and rings for the longest period of time. The voltage response for the shortest half-speed preamble C, which is represented in FIG. 6B, is almost the same as the voltage response for the baseline preamble, except that it does not droop quite as far. In contrast, the voltage response for the preamble CC, which is illustrated in FIG. 6C, droops considerably less and dies out faster than the baseline voltage response. Similarly, the voltage response for the preamble CCC, which is illustrated in FIG. 6D, droops even less than the voltage response for the preamble CC and dies out faster than all of the other voltage responses. Interestingly, the voltage response for the preamble CCCC, which is represented in FIG. 6E, has a larger amplitude and dies out more slowly than the voltage response for the shorter preamble CCC. Hence, it appears that the preamble CCC provides the best voltage response in comparison to the other preambles.

Note that the preamble CCC has a duration of about ½ of a ringing period. More specifically, the hexadecimal patterns are referenced to a bit rate of 3.2 Gbps. Hence, the preamble CCC, which is 12 bit periods long, has a duration of 12*312.5 ps=3.75 ns. This is close to, but not exactly equal to, ½ of the ringing period. This is not surprising because in an ideal case of a pure second-order PDN with no damping, wherein a single-step power transition is divided into two smaller equal steps, a time delay of ½ of the ringing period between the steps causes the second step to substantially cancel out the ringing of the first step. Because a real system deviates from this idealized case, the optimal duration is likely to be somewhat different.

Referring back to FIGS. 6A-6E, the duration of the preamble CC is 8*312.5 ps=2.5 ns, which is close to ⅓ of the ringing period, and the duration of the preamble CCCC is 16*312.5 ps=5 ns, which is close to ⅔ of the ringing period. Hence, any half-rate preamble that falls within the range from ⅓ to ⅔ of a ringing period will perform at least as well as the preambles CC and the CCCC, and can possibly perform as well as the preamble CCC. In other words, the CCC preamble might not be the optimal duration half-rate preamble within this range.

A large number of different metrics can be used to compare voltage responses. One possible metric involves determining a maximum allowable voltage noise margin for the system (for example±3.0 millivolts), and then determining an amount of time it takes for each voltage response curve to fall within the allowable margin without subsequently exceeding the allowable margin. Once the response curve falls within the allowable margin, the clocked circuitry can begin to operate without errors. Also note that under this metric an advantageous preamble is the preamble that requires the shortest amount of time to fall within the allowable margin.

Memory Controller

Figure 7:
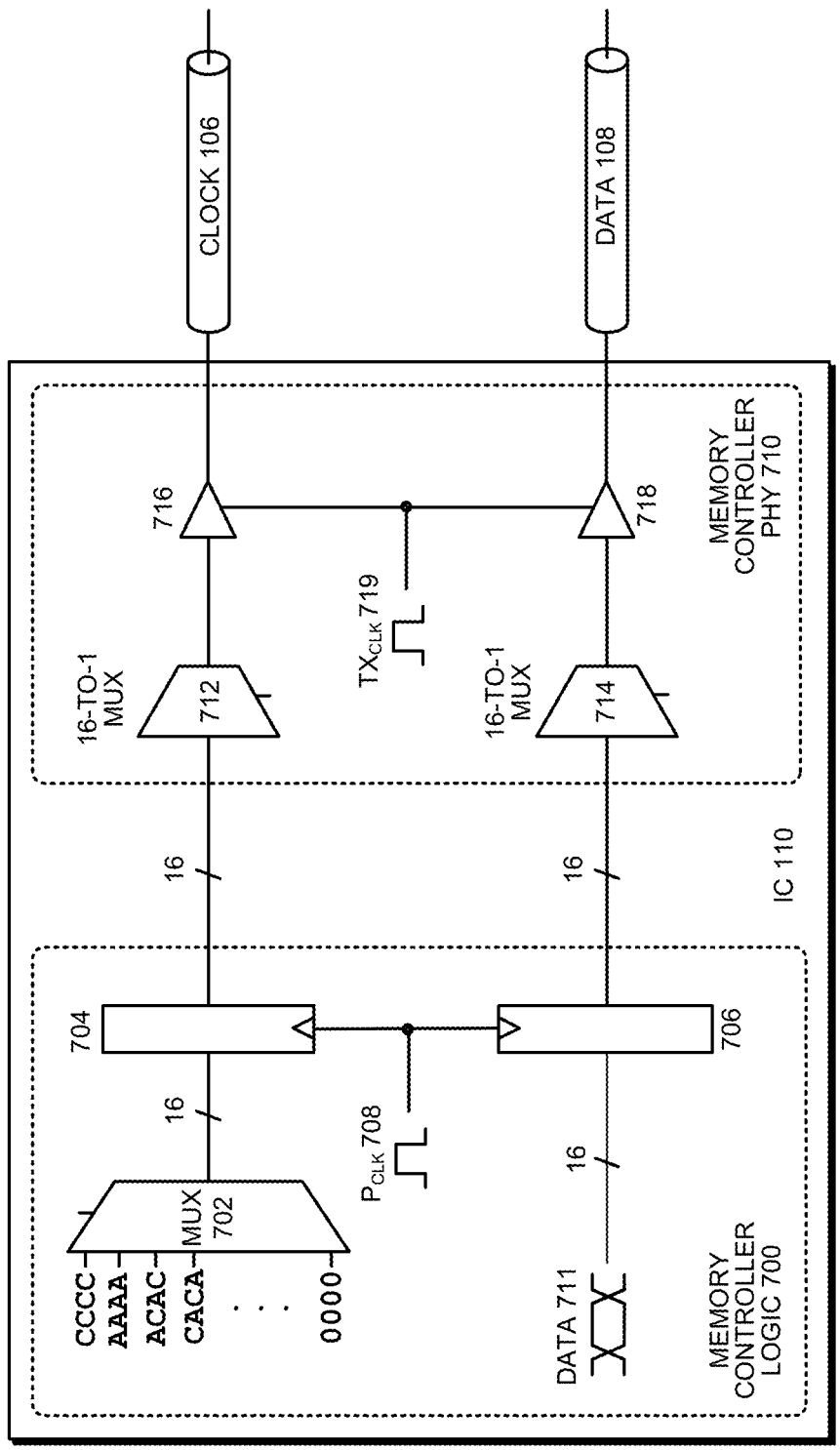
FIG. 7 illustrates a memory controller that supports clock stuttering preambles in accordance with the disclosed embodiments.

FIG. 7 illustrates circuitry within an IC chip 110 that supports clock-stuttering preambles in accordance with the disclosed embodiments. In this example, IC chip 110 includes a memory controller, which includes memory controller logic 700 comprising logic circuitry that coordinates operations of the memory controller.

Memory controller logic 700 also includes a register 706 which buffers 16-bit data words from a data stream 711. Note that these 16-bit data words can include command, address or data information for the memory transactions. It also includes another register 704, which buffers one or more 16-bit clock-signal patterns for different clock sequence segments, such as CCCC or AAAA. During operation, multiplexer (MUX) 702 is used to select a specific clock-signal pattern such as CCCC, AAAA, ACAC, . . . , 0000. Note that registers 706 and 704 are controlled by a parallel clock signal 708, which latches data words and clock signal words, respectively, into registers 706 and 704.

The 16 bits from data register 706 feed into a 16-to-1 MUX 714 which serializes 16-bit data words into a single data line which feeds into line driver 718. Line driver 718 drives this serialized signal across data channel 108 to a corresponding memory device (or devices). Similarly, the 16 bits from the clock-signal-pattern register 704 are serialized through another 16-to-1 MUX 712, which serializes 16-bit clock-signal patterns into a single data line that feeds into line driver 716. Line driver 716 drives the serialized clock signal across clock channel 106 to the corresponding memory device (or devices). Note that line drivers 716 and 718 are clocked using a transmit (TX) clock signal 719. Also note that 16-to-1 MUXes 712 and 714 are controlled to generate any selected 16-bit pattern, for example by using some type of counter or Grey-code generator.

During a clock start event, IC 110 in FIG. 7 can create a stuttered clock pattern in response to a clock start event, for example, by first controlling MUX 702 to select the 0000 pattern for one clock segment, then the CCCC pattern (half speed clock) as a stuttered preamble during the next clock segment, and then the AAAA clock pattern (normal speed clock) for future segments. In some embodiments data signal 711 for transmission may only be valid within the interval where the normal speed clock is selected (that is, after the preamble is complete).

In other embodiments, instead of using MUX 702 to select a clock-signal pattern, a generalized lookup table can be used to look up different clock-signal preamble patterns stored in hardware, firmware, or software. Moreover, the system can be programmed to use different preambles based on calibration operations that take place either during system manufacturing, or during system initialization operations during system boot-up. For example, once the manufacture of a system containing an IC and its associated on-chip and off-chip PDN components is complete, an optimal preamble sequence can be calibrated and stored in software, firmware, or hardware in the system. Alternatively, in systems with some manufacturing variation in the overall PDN, multiple preambles may be tested during system initialization and the best one selected based on observation of supply noise or a consequential effect such as the operating margin of a particular synchronous circuit or communication system. In yet another embodiment, any desired pattern may be dynamically selected.

Clock-Stuttering Process

Figure 8:
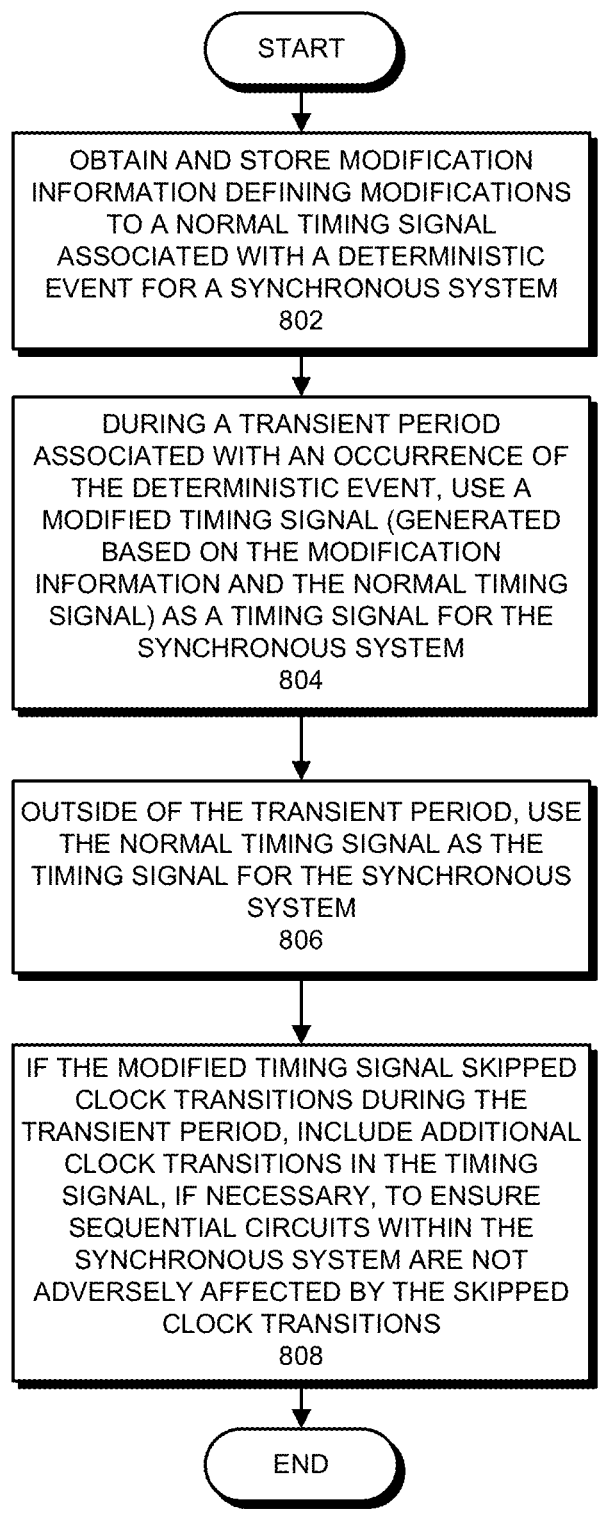
FIG. 8 presents a flow chart illustrating the process of clock stuttering in accordance with the disclosed embodiments.

FIG. 8 presents a flow chart illustrating the process of clock stuttering in accordance with the disclosed embodiments. First, the system obtains and stores modification information defining modifications to a normal timing signal to produce a modified timing signal to be used during a transient period associated with a deterministic event (step 802). This deterministic event can generally include any type of event that gives rise to transient problems that can be alleviated by modifying the clock signal. For example, the deterministic event can include by way of non-limiting examples: a power-up event; a clock-starting event; a clock-frequency-increasing event; a power-down event; a clock-stopping event and a clock-frequency-decreasing event.

Moreover, the modification information for a deterministic event can be obtained empirically by: (1) generating different timing signal patterns (either randomly or systematically); (2) monitoring the response of the system (e.g., link margin or supply noise) to the different timing signals during a transient period associated with the deterministic event; and (3) selecting a specific timing signal pattern to be used for the deterministic event based on a comparison between the responses. This modification information can be determined at a time of manufacture for the system. Alternatively, the modification information can be determined or calibrated during system initialization.

Next, during a transient period associated with an occurrence of the deterministic event, the system uses a modified timing signal generated based on a normal timing signal as a timing signal for the synchronous system (step 804). In some embodiments, the modified timing signal comprises a pattern of clock transitions which are skipped in the normal timing signal to generate the modified timing signal. In further embodiments, the duration of the modified timing signal ranges from ⅓ to ⅔ of a ringing cycle associated with a ringing frequency of the power distribution network. Note that there are other possible ranges for the duration of the timing cycle, for example ¼ to ½ of a ringing cycle.

Outside of the transient period, the system uses the normal timing signal instead of the reference signal as the timing signal for the synchronous system (step 806). (Note that the terms "normal timing signal" or "reference timing signal" as used in this disclosure and the appended claims can refer to an operating clock, which is used, for example, to clock out data transmissions or to sample an inbound signal.)

Finally, if using the modified clock signal caused a number of clock transitions to be skipped, the system can include additional clock transitions in the timing signal, if necessary, to ensure that sequential circuits within the synchronous system are not adversely affected by the skipped clock transitions (step 808). For example, if the first eight pulses were reduced to five clock pulses, the system may need to generate three additional clock pulses at a later time to ensure proper operation of sequential circuits in the system. More specifically, if the deterministic event in step 802 was a clock start event, then the additional pulses might be added in a post-amble, which for example may be associated with a succeeding clock stop event. Alternatively, as is illustrated in FIG. 1B the system can use a framing signal 130, which operates at 1/16 the data rate and indicates the start of a new data word, to cause the sequential circuits in the system to become resynchronized.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above.

When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. An integrated circuit (IC) chip, comprising:
transceiver circuitry for communicating over a link during a data transfer mode of operation; and
timing control circuitry to
generate a first timing signal of a first frequency for use by the transceiver circuitry during the data transfer mode of operation, and
generate a second timing signal of a second frequency less than the first frequency for use by the transceiver circuitry during a transient period resulting from a transition between the data transfer mode of operation and a second mode of operation.

2. The IC chip of claim 1, wherein:
the second timing signal includes a preamble.

3. The IC chip of claim 1, wherein:
the second mode of operation comprises an off state of the IC.

4. The IC chip of claim 1, wherein:
the second mode of operation comprises a low-power mode of operation, and
wherein the timing control circuitry generates a third timing signal for use during the low-power mode of operation, the third timing signal having a third frequency less than the second frequency.

5. The IC chip of claim 1, wherein:
the first and second timing signals comprise first and second clock signals.

6. The IC chip of claim 1, wherein:
the transient period comprises a time interval between an end of steady state operation in the first mode of operation, and a beginning of the second mode of operation.

7. The IC chip of claim 1, wherein:
the first frequency is an integer multiple of the second frequency.

8. The IC chip of claim 1, further comprising:
storage to store a value representing the second frequency; and
wherein the timing control circuitry is operative to retrieve the value from the storage to generate the timing signal of the second frequency.

9. A method of operation in an integrated circuit (IC) chip, the method comprising:
communicating over a link with transceiver circuitry during a data transfer mode of operation;
generating a first timing signal of a first frequency for use by the transceiver circuitry during the data transfer mode of operation; and
generating a second timing signal of a second frequency less than the first frequency for use by the transceiver circuitry during a transient period resulting from a transition between the data transfer mode of operation and a second mode of operation.

10. The method of claim 9, wherein:
the second timing signal includes a preamble.

11. The method of claim 9, wherein:
the second mode of operation comprises an off state of the IC.

12. The method of claim 9, wherein:
the second mode of operation comprises a low-power mode of operation, and
wherein the method further comprises
generating a third timing signal for use during the low-power mode of operation, the third timing signal having a third frequency less than the second frequency.

13. The method of claim 9, wherein:
the first and second timing signals comprise first and second clock signals.

14. The method of claim 9, wherein:
the transient period comprises a time interval between an end of steady state operation in the first mode of operation, and a beginning of the second mode of operation.

15. The method of claim 9, wherein the method further comprises:
storing a value representing the second frequency; and
retrieving the value to generate the timing signal of the second frequency.

16. The method of claim 13, wherein during the fault mode of operation for each of the multiple IC memory components, the method comprising:
enabling the secondary interface to carry out data transfer operations while disabling the primary interface.

17. An integrated circuit (IC) memory controller chip, comprising:
a transceiver circuit for communicating with a memory during a data transfer mode of operation; and
a timing control circuit to
generate a first timing signal of a first frequency for use by the transceiver circuit during the data transfer mode of operation, and
generate a second timing signal of a second frequency less than the first frequency for use by the transceiver circuitry during a transient period resulting from a transition between the data transfer mode of operation and a second mode of operation.

18. The IC memory controller chip of claim 17, wherein:
the first and second timing signals include a preamble.

19. The IC memory controller chip of claim 17, wherein:
the first and second timing signals comprise first and second clock signals.

20. The IC memory controller chip of claim 17, further comprising:
storage to store a value representing the second frequency; and
wherein the timing control circuit is operative to retrieve the value from the storage to generate the timing signal of the second frequency.

* * * * *